July 18, 1967

W. J. SCHMIDT ETAL 3,331,989

VOLTAGE COMPARATOR CIRCUITS

Filed Aug. 12, 1963

WITNESSES:
Bernard R. Gieguey
James F. Young

INVENTORS
Warren J. Schmidt and
John C. Gambale.
BY C. L. Freedman
ATTORNEY

July 18, 1967
W. J. SCHMIDT ETAL
3,331,989
VOLTAGE COMPARATOR CIRCUITS
Filed Aug. 12, 1963
3 Sheets-Sheet 2
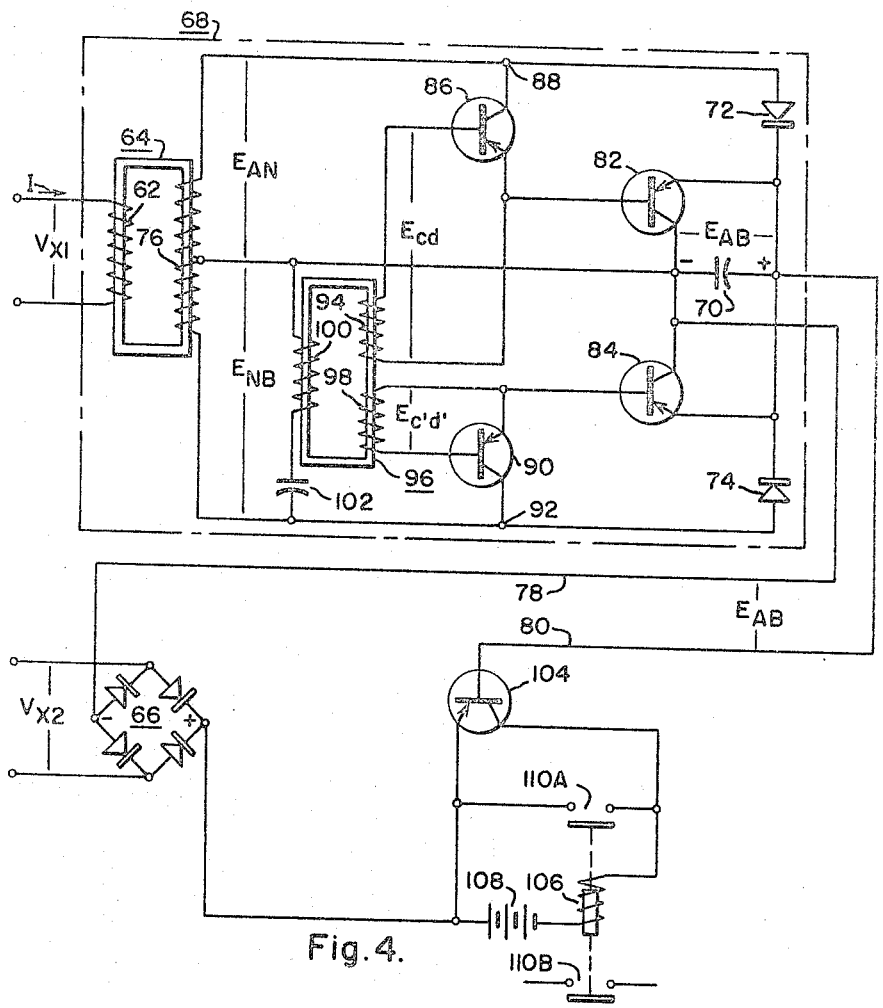
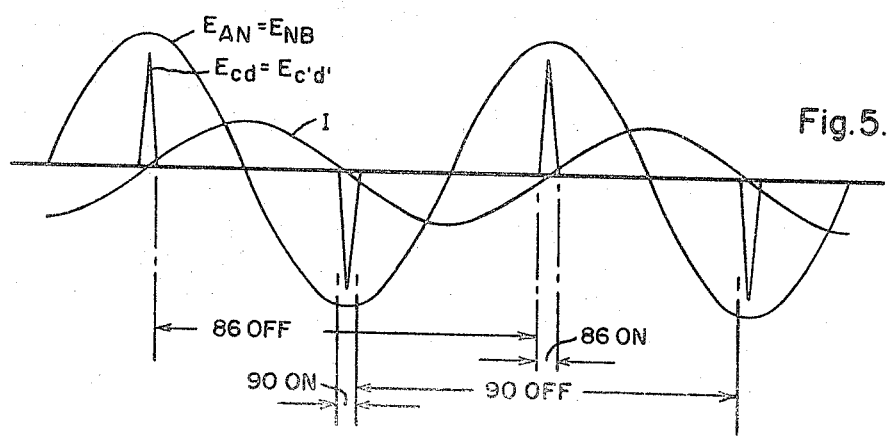

United States Patent Office 3,331,989
Patented July 18, 1967

3,331,989
VOLTAGE COMPARATOR CIRCUITS
Warren J. Schmidt, Upper Montclair, and John C. Gambale, Livingston, N.J., assignors to Westinghouse Electric Corporation, Pittsburgh, Pa., a corporation of Pennsylvania
Filed Aug. 12, 1963, Ser. No. 301,506
17 Claims. (Cl. 317—27)

This invention relates to voltage comparator circuits for actuating a relay or the like when the magnitude of one of two alternating current voltages exceeds that of the other. More particularly, the invention relates to voltage comparator circuits of the type described which are useful in detecting faults in a polyphase electrical system.

Although not limited thereto, the circuits of the present invention are adapted for use in a compensator relaying system of the general type shown in U.S. Patent No. 2,973,459. Such a system relates to relaying multiphase faults on transmission lines and derives its name from the compensators employed which are essentially air-gap transformers with current-energized primary windings and voltage secondary windings. These compensators give current-derived voltages which are subtracted from the system voltages at the relay location. The net voltages so obtained can then be applied to filters which derive positive and negative sequence voltages. Operation of the system is dependent upon the fact that in a normal polyphase system, the positive sequence component or voltage is equal to the normal line to neutral voltage of the system, while the negative sequence component or voltage is zero. When an unbalanced fault occurs, a negative sequence component will appear. If the fault is on one side of a balance point, the negative sequence component will exceed the positive sequence component, and vice versa. Accordingly, by comparing the positive and negative sequence components, it can be determined whether or not the fault occurs in a protected zone.

As an overall object, the present invention seeks to provide voltage comparator circuits adapted to actuate an electrical utilization device such as a relay when the magnitude of one of two alternating current voltages exceeds that of the other.

More specifically, an object of the invention is to provide circuits for comparing the positive and negative sequence components derived in a compensator distance relaying system of the type described above.

Still another object of the invention is to provide new and improved filter means for use in voltage comparator circuits.

The above and other objects and features of the invention will become apparent from the following detailed description taken in connection with the accompanying drawings which form a part of this specification, and in which:

FIG. 4 is a schematic circuit diagram of an embodiment of the invention employing novel filter means characterized in a speed-up in response of the filter to sudden decreases in the supply voltage;

FIG. 5 is a graph illustrating the operation of the circuit of FIG. 4;

Figure 1:
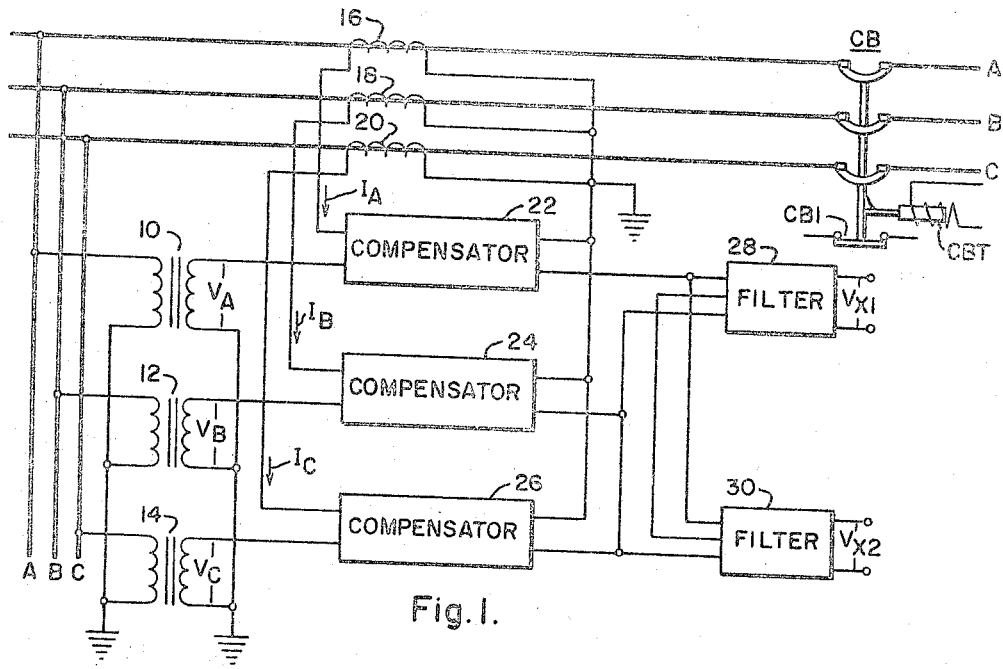
FIGURE 1 is an illustration of the voltage and current circuits of the phase-to-phase portion of a compensator relay with which the circuits of the present invention may be used.

Referring now to the drawings, and particularly to FIG. 1, three phases or leads of a polyphase system A, B and C are shown together with a circuit breaker CB having a tripping solenoid CBT and an auxiliary switch CB1. Voltages $V_A$, $V_B$ and $V_C$ corresponding to the three phase-to-ground voltages of the system are derived across the secondaries of transformers 10, 12 and 14; whereas the three currents $I_A$, $I_B$ and $I_C$ corresponding to the three line currents of the system are derived by means of current transformers 16, 18 and 20. The voltages and currents of the respective phases are fed to three compensators 22, 24 and 26 which, as mentioned above, comprise air-gap transformers with primary windings energized by currents $I_A$, $I_B$ and $I_C$ and secondary windings respectively in series with the voltages $V_A$, $V_B$ and $V_C$. The outputs of the compensators 22, 24 and 26 are current-derived voltages which are subtracted from the voltages $V_A$, $V_B$ and $V_C$. The net voltages so obtained are passed through filters 28 and 30 to produce a positive sequence voltage $V_{X1}$ and a negative sequence voltage $V_{X2}$.

Figure 2:
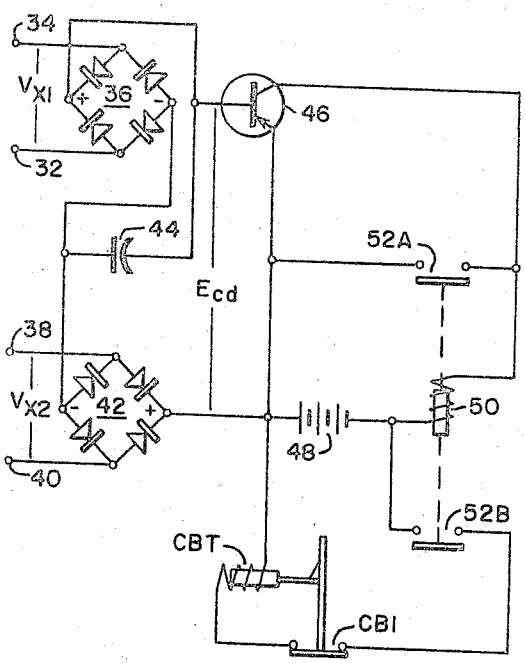
FIG. 2 is a schematic circuit diagram of one embodiment of the invention.

A circuit for comparing the two voltages $V_{X1}$ and $V_{X2}$ to operate a relay when the negative sequence voltage $V_{X2}$ is greater than the positive sequence voltage $V_{X1}$, regardless of the phase difference between the voltages, is shown in FIG. 2. The positive sequence voltage $V_{X1}$ is applied through input terminals 32 and 34 to a full-wave rectifier 36. In a similar manner, the negative sequence voltage $V_{X2}$ is applied through input terminals 38 and 40 to a second full-wave rectifier 42. The output of the full-wave rectifier 36 is filtered by capacitor 44 and combined differentially with the rectified output of rectifier 42 to produce a voltage $E_{cd}$ which is applied between the emitter and base of a transistor 46. Included in the emitter-to-collector circuit of the transistor 46 is a source of voltage, such as battery 48, and the energizing coil of a relay 50. Relay 50 is provided with normally open contacts 52A which close when the relay is energized to lock or hold it in its energized condition.

With the arrangement shown, the voltage $E_{cd}$ will make the emitter positive relative to the base of the transistor whenever the instantaneous magnitude of the negative sequence voltage $V_{X2}$ exceeds the maximum voltage of the positive sequence components $V_{X1}$. This assumes that the RC time constant of the filter comprising capacitor 44 and rectifier 36 is large with a very small ripple content. Under these conditions, the transistor 46 will conduct and the relay 50 will be energized. As mentioned above, the relay 50 will seal-in and stay closed, even though the negative sequence component $V_{X2}$ becomes smaller than positive sequence component $V_{X1}$. When, however, $V_{X1}$ exceeds $V_{X2}$, the transistor will be reverse biased and will not conduct. The relay 50 has contacts 52B which close when the relay picks up to complete a tripping circuit of a tripping solenoid CBT through auxiliary contacts CB1 of the circuit breaker CB.

Although the circuit of FIG. 2 is satisfactory for its intended operation, it has the disadvantage of slow response when the voltage conditions change from a situation where the positive sequence component $V_{X1}$ is much larger than the negative sequence component $V_{X2}$ to a condition where $V_{X2}$ is slighly larger than $V_{X1}$. This is due to the fact that it takes time, determined by the RC time constant of the filter comprising capacitor 44 and rectifier 36, to follow sudden decreases in the positive sequence component $V_{X1}$.

Figure 3:
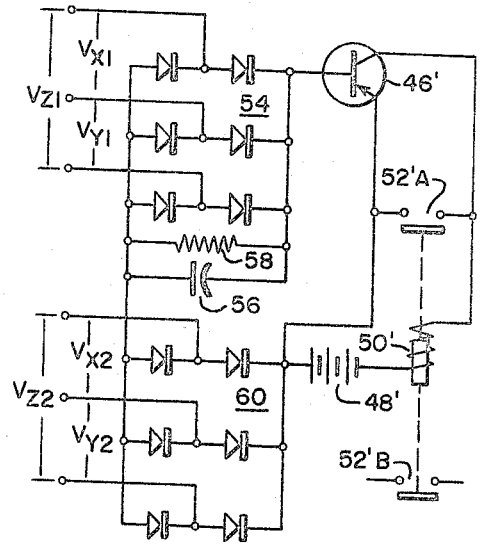
FIG. 3 is a schematic circuit diagram of another embodiment of the invention.

In order to speed up the response of the filter to sudden decreases in the positive sequence component $V_{X1}$, the circuit of FIG. 3 can be employed. In this case a three-phase positive sequence voltage comprising phase components $V_{X1}$, $V_{Y1}$ and $V_{Z1}$ is rectified in a three-phase bridge rectifier 54 and applied across capacitor 56 and resistor 58 in parallel. In a similar manner, a three-phase negative sequence voltage comprising phase components $V_{X2}$, $V_{Y2}$ and $V_{Z2}$ is rectified in a three-phase rectifier 60. The rectifier output of rectifier 60 is combined with the filtered voltage appearing across resistor 58 and capacitor 56 in series opposition to produce the voltage $E_{cd}$ which is applied between the emitter and base of transistor 46′. The emitter-to-collector circuit of transistor 46′ includes battery 48′ and relay 50′ being provided with normally open contacts 52′A which close to lock-in the relay once it is tripped, and normally open contacts 52′B which may be employed for tripping a circuit breaker as discussed for the relay 50. The operation of the circuit of FIG. 3 is essentially the same as that of FIG. 2. The additional ripple created by resistor 58, however, is offset by applying the filter comprising elements 56 and 58 and with the bridge-rectified three-phase voltage. The three-phase rectifier 60 shortens the time between the occurrence of a fault and the appearance of the rectified $V_{X2}$, $V_{Y2}$ or $V_{Z2}$ voltage in the base circuit of transistor 46′. With the arrangement of FIG. 3, sudden decreases in the positive sequence component will not materially decrease the speed of operation of relay 50′.

In FIG. 4 another arrangement is shown including a filter having a fast response time when the positive sequence component $V_{X1}$ decreases. With reference to FIG. 4, the positive sequence component $V_{X1}$ is applied to the primary winding 62 of input transformer 64. The negative sequence component $V_{X2}$ is applied to a full-wave rectifier 66 similar to rectifier 42 of FIG. 2. Basically, the filter circuit of FIG. 4, enclosed by broken lines and identified by the numeral 68, includes a capacitor 70 corresponding to capacitor 44 in FIG. 2, together with two diodes 72 and 74. The capacitor 70 is connected, as shown, between the junction of the cathodes of diodes 72 and 74 and a center tap on the secondary winding 76 of input transformer 64; while the anodes of diodes 72 and 74 are connected to the opposite ends of the secondary winding 76. It will be appreciated that the center tap divides the winding 76 into a pair of opposed secondary winding portions. The combination of elements 64, 70, 72 and 74 comprise a standard full-wave filter circuit with the output of the filter appearing across leads 78 and 80. The output voltage of a filter or rectifier comprising the elements just described will change immediately if the supply voltage $V_{X1}$ suddenly increases, assuming low internal impedance in the supply and the transformer 64. If, however, the supply voltage $V_{X1}$ suddenly decreases, the output of the filter consisting of elements 64, 70, 72 and 74 alone will change slowly, depending upon the RC time constant involved. The smaller the allowable ripple in the output voltage, the longer it will take the filter to respond to sudden decreases in the supply voltage.

To speed up the response of the filter to sudden decreases in the supply voltage, the additional elements shown in FIG. 4 are provided. It will be noted that a first transistor 82 is connected in shunt with the capacitor 70 and has its emitter connected to the cathode of diode 72. In a somewhat similar manner, a second transistor 84 is also connected in shunt with the capacitor 70, but has its emitter connected to the cathode of diode 74. The base of transistor 82 is connected through the emitter and collector of a transistor 86 to point 88; while the base of transistor 84 is connected through the emitter and collector of transistor 90 to point 92. Connected between the emitter and base of transistor 86 is an output winding 94 on a saturable core transformer 96; and, similarly, a second output winding 98 on the saturable core transformer 96 is connected between the emitter and base of transistor 90. The input winding 100 on saturable core transformer 96 is connected in series with a capacitor 102, the series combination being connected in shunt with the lower half of the secondary winding 76 on transformer 64.

For the circuit just described, the rectified and filtered output voltage across capacitor 70 is compared once each half cycle to the supply voltage and corrected if the output voltage is larger than the input voltage. Operation of the circuit may best be understood by reference to FIG. 5. Normally, transistors 82 and 84 are cut off and capacitor 70 charges in the normal manner. However, whenever the instantaneous voltage $E_{AB}$ across capacitor 70 is larger than the instantaneous voltage $E_{AN}$ across the upper half of secondary winding 76, for example, a current tends to flow from the cathode of diode 72 through transistor 82 and transistor 86 to point 88. This will occur, however, only when the transistor 86 is rendered conducting, and transistor 86 is normally cut off except during those times when the saturable core transformer 96 dictates.

With reference to FIG. 5, it can be seen that the current I leads the voltages $E_{AN}$ and $E_{NB}$ by approximately 90°. This is due to the face that the capacitor 102 connected in series with the primary winding 100 is made very large compared to the effective inductance of the winding 100 on the saturable core transformer 96. The result is that the change of flux in the saturable core transformer 96 will take place as the current I goes through zero. This change in flux gives rise to the voltage $E_{cd}$ or $E_{c'd'}$ which turns on transistor 86 or 90, as the case may be.

Transistor 86 is on for only a short period at the peak of the $E_{AN}$ voltage wave form and only when the $E_{AN}$ voltage is in the charging direction. Transistor 82 will, therefore, be in a conductive state to short the capacitor 70 only when transistor 86 is on and the voltage across capacitor 70, $E_{AB}$, is greater than the voltage $E_{AN}$ across the upper half of secondary winding 76. This condition prevails when the supply voltage drops below the value it held previously. When transistor 82 conducts, it places a low impedance path across the capacitor 70, discharging at a very high rate. The discharge of capacitor 70 is stopped either by transistor 86 being cut off or by the instantaneous value of the voltage $E_{AB}$ equalling the instantaneous value of voltage $E_{AN}$. By making the RC time constant of the combination of transistor 82 and capacitor 70 very small, it is possible to equalize the voltages $E_{AB}$ and $E_{AN}$ during the time that the voltage $E_{cd}$ is present across winding 94 of the saturable core transformer 96.

The foregoing description applies for only the upper half of the filter circuit 68. The lower half, however, operates in the identical manner. That is, when the voltage $E_{AB}$ across capacitor 70 is greater than the voltage $E_{NB}$ across the lower half of secondary winding 76, transistor 90 will be turned on when the current I passes through the zero axis by voltage $E_{c'd'}$ across winding 98 on saturable core transformer 96, thereby turning on transistor 84 to short the capacitor 70 and thereby equalize the voltages $E_{AB}$ and $E_{NB}$. This process, of course, alternates between the upper and lower halves of the filter circuit 68 during successive half cycles of the applied voltage.

As in the embodiments of FIGS. 2 and 3, the voltage $E_{AB}$ across capacitor 70, which is proportional to the positive sequence component $V_{X1}$, is combined in series opposition with the output across rectifier 66 which is proportional to the negative sequence component $V_{X2}$. The combined voltages are then applied between the base and emitter of transistor 104; and when the negative sequence component $V_{X2}$ exceeds the positive sequence component $V_{X1}$, the transistor 104 will be rendered conducting to energize relay 106 through battery 108. Energization of the relay 106, as in the previous embodiments, closes contacts 110A to lock-in the relay, and closes contacts 110B.

Figure 6:
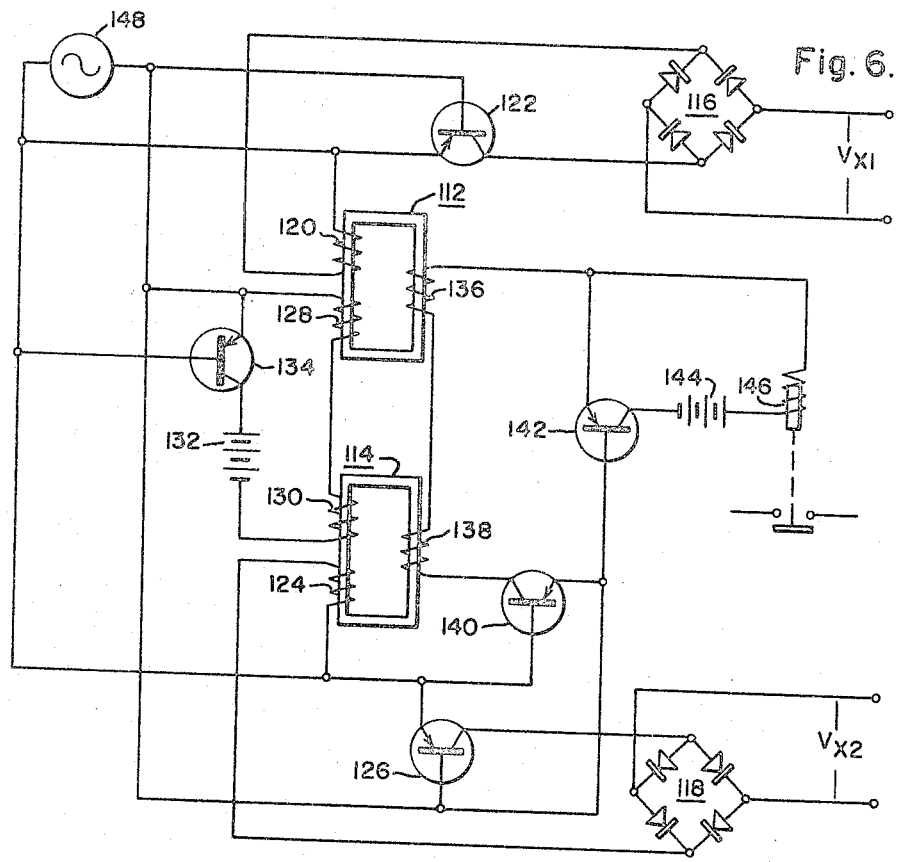
FIG. 6 is a schematic circuit diagram of still another embodiment of the invention employing saturable core integrators.

In FIG. 6 another embodiment of the invention is shown employing a pair of saturable core integrators 112 and 114. The positive sequence voltage $V_{X1}$ is applied across full-wave rectifier 116; whereas the negative sequence component $V_{X2}$ is applied across a second full-wave rectifier 118. The rectified output of rectifier 116 is applied across an input winding 120 of the saturable core integrator 112 through switching transistor 122; whereas the rectified output of rectifier 118 is applied across an input winding 124 of saturable core integrator 114 through switching transistor 126.

The voltage applied across the input windings 120 and 124 serve to drive the cores of integrators 112 and 114 toward saturation. The cores are reset by means of windings 128 and 130, respectively, connected in series to a source of voltage, such as battery 132, through switching transistor 134. The output windings 136 and 138 of the saturable core integrators 112 and 114, respectively, are connected in series; and, through switching transistor 140, are connected between the emitter and base of transistor 142 which corresponds to the transistor 46 of FIG. 2. Transistor 142 is normally non-conducting; however when it conducts it connects a source of voltage, such as battery 144, to the energizing coil of a trip relay 146.

Operation of the switching transistors 122, 126, 134 and 140 is controlled by a source of 60-cycle alternating current voltage 148. During one-half cycle of the voltage source 148, the transistors 122 and 126 will conduct while transistors 134 and 140 are cut off. On the next half cycle of voltage source 148, the states of conduction of the transistors are reversed with transistors 122 and 126 being cut off while transistors 134 and 140 are conducting.

From a consideration of the circuit of FIG. 6, it will be apparent that the two voltages $V_{X1}$ and $V_{X2}$ being compared are rectified and fed into the saturable core integrators 112 and 114 over a half cycle during every cycle of the voltage source 148. During the next half cycle, the integrals of these two voltages with respect to time are compared, and if the negative sequence voltage $V_{X2}$ is higher than the positive sequence voltage $V_{X1}$, the relay 146 is energized. The integration for a half cycle and comparison for a half cycle is completed once during each cycle of the voltage source 148.

Figure 7:
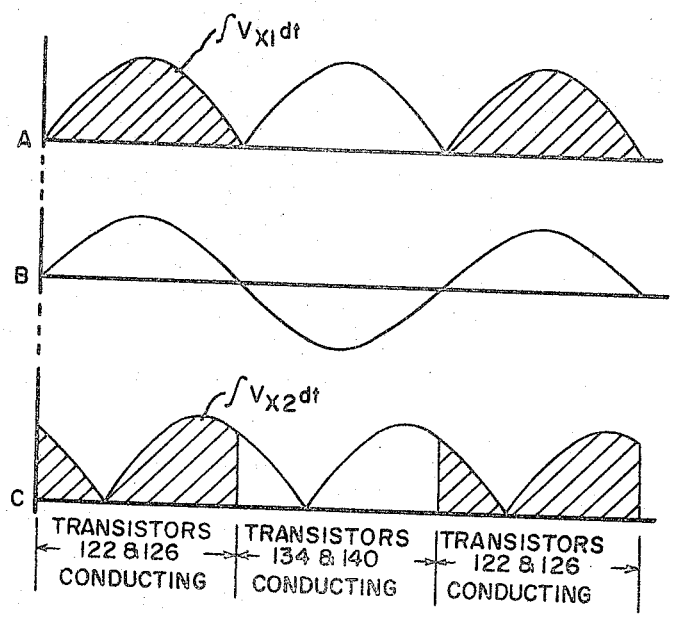
FIG. 7 illustrates wave forms appearing at various points in the circuit of FIG. 6.

Operation of the circuit may best be understood by reference to FIG. 7. Wave form A is the output of rectifier 116; wave form B is the output of voltage source 148; and wave form C is the output of rectifier 118. When transistor 122 is conducting during a positive half cycle of wave form B at the output of voltage source 148, the rectified positive sequence voltage $V_{X1}$ (wave form A) is applied across winding 120 of integrator 112. This causes the core of integrator 112 to become partially saturated in accordance with the equation $\int V_{X1} dt$. In other words, wave form A is integrated with respect to time during the first half cycle of wave form A. At the same time, transistor 126 is rendered conductive by the positive half cycle of wave form B, thereby applying the full-wave rectified output of rectifier 118 (wave form C) to winding 124 on saturable core integrator 114. This causes the core of integrator 114 to become partially saturated in proportion to $\int V_{X2} dt$. At the end of one-half cycle of the 60-cycle voltage source 148 (wave form B) both transistors 122 and 126 become non-conducting while transistors 134 and 140 become conducting. When transistor 134 conducts, the voltage from battery 132 appears across windings 128 and 130 with the windings being such that the voltage will unsaturate or rather remove the partial saturation from the cores of integrators 112 and 114 caused by $\int V_{X1} dt$ and $\int V_{X2} dt$. In this process, a voltage will be induced across winding 136, the duration of which is porportional to $\int V_{X1} dt$ and another voltage will be induced across winding 138, the duration of which is proportional to $\int V_{X2} dt$.

The windings 136 and 138 are wound in opposite directions such that the voltages appearing across these two windings will subtract from one another. The integrals of voltages $V_{X1}$ and $V_{X2}$ are illustrated by the shaded portions of wave forms A and C, respectively, in FIG. 7; and it will be noted that the two wave forms need not be in phase. Integration occurs during the first half cycle of source 148, wave form B, during which time the transistors 122 and 126 are conducting. On the next half cycle (i.e., from 180° to 360° of wave form B) transistor 134 conducts to reset the cores of integrators 112 and 114. At the same time, transistor 140 is rendered conducting by the negative half cycle of voltage source 148. Transistor 142 is arranged to conduct when the voltage across winding 138 is of greater duration than that across winding 136, which will occur when the integral $\int V_{X2} dt$ of the negative sequence component is greater than $\int V_{X1} dt$, the integral of the positive sequence component. Consequently when this condition occurs the transistor 142 will be rendered conducting to permit battery 144 to energize coil 146.

Although the invention has been shown in connection with certain specific embodiments it will be readily apparent to those skilled in the art that various changes in form and arrangement of parts may be made to suit requirements without departing from the spirit and scope of the invention.

We claim as our invention:

1. A voltage comparator adapted to actuate an electrical utilization device when the magnitude of one of two alternating current voltages has a predetermined relationship with respect to that of the other, comprising rectifiers for rectifying both of said voltages, means for filtering the first of said voltages, said filtering means comprising a capacitor connected to at least one of said rectifiers, switch devices connected in shunt with said capacitor, said switch devices being normally non-conductive, means for rendering the first of said switch devices conductive for an interval during the positive half cycle of said first voltage when the voltage across said capacitor exceeds the magnitude of said positive half cycle, means for rendering the second of said switch devices conductive for an interval during the negative half cycle of said first alternating current voltage when said voltage across said capacitor exceeds the magnitude of said negative half cycle, means responsive to the output of said filtering means and the output of the other of said rectifiers for producing an output voltage having a predetermined polarity when the magnitude of said one of said two alternating current voltage has said predetermined relationship with respect to that of the other, a source of voltage for said electrical utilization device, a normally open switch device for connecting said voltage source to the electrical utilization device, and means for closing the switch device when the output voltage is of said predetermined polarity.

2. A voltage comparator adapted to actuate an electrical utilization device when the magnitude of one of two alternating current voltages exceeds that of the other, comprising rectifiers for rectifying both of said voltages, a pair of saturable core transformers each having input and output windings inductively coupled thereto, switch devices for applying the respective rectified voltages from said rectifiers to the input windings on the respective transformers during one-half cycle of an alternating current signal, the cores being driven toward saturation during said one-half cycle, means for resetting said cores during the other half cycle of said alternating current signal, means for connecting said output windings in series during said other half cycle whereby the voltage on one output winding will oppose that on the other output winding to produce a combined voltage having a polarity dependent upon the relative magnitudes of the voltages across said output windings during reset of the cores, and means for applying said combined voltage to the electrical utilization device only when it is of a polarity which exists when the magnitude of said one alternating current voltage exceeds that of the other.

3. A voltage comparator adapted to actuate an electri-cal utilization device when the magnitude of one of two alternating current voltages exceeds that of the other comprising rectifiers for rectifying both of said voltages, a pair of saturable core transformers each having a pair of input windings and an output winding inductively coupled thereto, switch devices for applying the respective rectified voltages from said rectifiers to one of the input windings on the respective transformers during one-half cycle of an alternating current signal, the cores being driven toward saturation during said one-half cycle, a source of resetting voltage and switch means coupled to said other input windings for resetting said cores during the other half cycle of said alternating current signal, switch means for connecting said output windings in series during said other half cycle whereby the voltage on one output winding will oppose that on the other output winding to produce a combined voltage having a polarity dependent upon the relative magnitudes of the voltages across said output windings during reset of the cores, and switch means responsive to said combined voltage for actuating the electrical utilization device only when it is of a polarity which exists when the magnitude of said one alternating current voltage exceeds that of the other.

4. A voltage comparator adapted to actuate an electrical utilization device when the magnitude of one of two alternating current voltages exceeds that of the other, comprising a first rectifier for rectifying one of said voltages, a second rectifier for rectifying the other of said voltages, a pair of saturable core transformers each having a pair of input windings and an output winding inductively coupled thereto, a first transistor switch device for applying the rectified voltage from one of said rectifiers to one of the input windings on one of said transformers during one-half cycle of an alternating current signal, a second transistor switch device for applying the rectified voltage from said second rectifier to one of the input windings on the other transformer during said one-half of an alternating current signal, the cores being driven toward saturation during said one-half cycle, a source of resetting voltage, a third transistor switch device for connecting said resetting voltage source to the other input windings of said cores during the other half cycle of said alternating current signal, means including a fourth transistor switch device for connecting said output windings in series during said other half cycle whereby the voltage on one output winding will oppose that on the other output winding to produce a combined voltage having a polarity dependent upon the relative magnitudes of the voltages across said output windings during reset of the cores, and means including a fifth transistor switch device for applying said combined voltage to the electrical utilization device only when it is of a polarity which exists when the magnitude of said one alternating current voltage exceeds that of the other.

5. A voltage comparator adapted to actuate an electrical utilization device whenever the magnitude of one of two alternating current voltages exceeds that of the other, comprising rectifiers for rectifying both of said voltages, means for integrating the rectified voltages with respect to time during one-half cycle of an alternating current signal, means for comparing the integrals of said rectified voltages with respect to time during the other half cycle of said alternating current signal, and means responsive to the compared integrals of the rectified voltages with respect to time for actuating said electrical utilization device when the magnitude of said one of the two alternating current voltages exceeds that of the other.

6. A voltage comparator adapted to actuate an electrical utilization device when the magnitude of a first of a plurality of alternating current voltages has a predetermined relationship with respect to a second of said voltages, comprising means for storing a quantity representative of the magnitude of said first of said alternating current voltages, means for adjusting the magnitude of said stored quantity at predetermined intervals, said predetermined intervals not being greater than the interval of one cycle of one of said alternating current voltages, means responsive to both the voltage produced by the stored quantity and said second alternating current voltage for producing an output voltage of a predetermined polarity when the magnitude of said alternating current voltages have said predetermined relationship, and means for actuating the electrical utilization device when said output voltage is of said predetermined polarity.

7. The voltage comparator of claim 6 in which said one voltage is said first voltage.

8. The voltage comparator of claim 7 in which said predetermined interval is not greater than the interval of one half cycle of said one voltage.

9. The voltage comparator of claim 7 in which said adjusting means is actuated at a predetermined time in each of selected half cycles of said first alternating current voltage.

10. A voltage comparator adapted to actuate an electrical utilization device when the magnitude of one of two alternating current voltages has a predetermined relationship with respect to that of the other, comprising rectifiers for rectifying both of said voltages, means for filtering a first of said voltages, said filtering means comprising a capacitor connected to at least one of said rectifiers, switch devices connected in shunt with said capacitor, said switch devices being normally non-conductive, means rendering a first of said switch devices conductive for an interval during the positive half cycle of said first voltage, said interval terminating at substantially said predetermined point, means rendering the second of said switch devices conductive for an interval during the negative half cycle of said first voltage, said interval terminating at substantially said predetermined point, means responsive to the output of said filtering means and the output of the other of said rectifiers for producing an output voltage having a predetermined polarity when the magnitude of said one of said two alternating current voltages has said predetermined relationship with respect to that of the other, a source of voltage for said electrical utilization device, a normally open switch device for connecting said voltage source to the electrical utilization device, and means for closing the switch device when the output voltage is of said predetermined polarity.

11. The combination of claim 10 in which each of said intervals is a minor fraction of the intervals of said half cycles of said first voltage.

12. An apparatus comprising an energy storage device, alternating voltage supplying means connected to said device for charging said device during selected half cycles of said means, means for adjusting the voltage of said device with respect to the charging voltage during predetermined intervals if the magnitude of the voltage of said device has a predetermined relationship with respect to the instantaneous magnitude of the voltage supplied by said voltage means, the duration of said predetermined intervals being less than the duration of ½ cycle of said charging voltage, and means rendering said adjusting means effective during at least certain of said selected half cycles of said charging voltage.

13. The combination of claim 12 wherein said rendering means actuates said adjusting means during each half cycle of said charging voltage.

14. The combination of claim 13 wherein said energy storage device comprises a capacitor, said charging means comprises an input transformer and rectifiers, and said adjusting means comprises switch means connected in shunt with said capacitor, said switch means being normally non-conductive, and means rendering said switch means conductive during said predetermined intervals when the voltage across the capacitor has said predetermined relationship, 15. The combination of claim 14 wherein said switch means comprise a first group of transistors, and wherein said means for rendering said transistors conductive comprise additional switch means, said additional switch means being normally maintained in a condition to hold said transistors non-conductive, and means actuating said additional switch means out of said normally maintained condition during said predetermined intervals.

16. The combination of claim 15 wherein said additional switch means comprise a second group of transistors, and wherein said means for actuating said transistors of said second group comprise a pulse generator, said pulse generator being operable to deliver pulses of the duration of said predetermined intervals, and means for actuating said pulse generator at predetermined times with respect to the phase of said charging voltage.

17. A fast acting filter comprising an input transformer having a pair of opposed secondary windings, a capacitor, first and second rectifiers, means for connecting one of said secondary windings to the first of said rectifiers and said capacitor, means for connecting the other of said secondary windings to the second of said rectifiers and said capacitor, a plurality of transistors, each having a power and a control circuit, said power circuits of a first and a second of said transistors being connected in shunt with said capacitor, said power circuit of a third and a fourth of said transistors being connected individually to said control circuits of said first and second transistors respectively, a saturable core transformer having a primary and first and second secondary windings, a phase shifting means, means connecting said primary winding of saturable core transformer with said phase shifting means and one of said secondary windings of said input transfomer, means connecting the first of said secondary windings of said saturable core transformer to the control circuit of said third transistor, and means connecting the second of said secondary windings of said saturable core transformer to the control circuit of said fourth transistor.

References Cited

UNITED STATES PATENTS

| | | | |
|---|---|---|---|
| 2,858,457 | 10/1958 | Epstein et al. | 317—47 X |
| 3,048,744 | 8/1962 | Warrington | 317—27 |
| 3,241,029 | 3/1966 | Slomski | 320—40 |

MILTON O. HIRSHFIELD, *Primary Examiner.*

J. D. TRAMMELL, *Assistant Examiner.*